United States Patent [19]
> Charles et al.

[11] Patent Number: 4,966,625
[45] Date of Patent: Oct. 30, 1990

[54] FERRITE COMPOSITE CONTAINING SILVER METALLIZATION

[75] Inventors: Richard J. Charles, Schenectady; Achuta R. Gaddipati, Scotia, both of N.Y.

[73] Assignee: General Electric Company, Schenectady, N.Y.

[21] Appl. No.: 361,183

[22] Filed: Jun. 5, 1989

Related U.S. Application Data

[62] Division of Ser. No. 172,834, Mar. 25, 1988, Pat. No. 4,880,599.

[51] Int. Cl.$^5$ .............................................. C22C 29/12
[52] U.S. Cl. ........................................ 75/234; 75/232; 75/235; 419/21; 419/23; 428/539.5
[58] Field of Search ...................... 75/232, 234, 235; 419/21, 23; 428/539.5

[56] References Cited

U.S. PATENT DOCUMENTS

| | | | |
|---|---|---|---|
| 3,333,333 | 8/1967 | Noack | 29/604 |
| 3,909,327 | 9/1975 | Pechini | 156/89 |
| 4,327,156 | 4/1982 | Dillon et al. | 419/10 |
| 4,462,827 | 7/1984 | Rellick | 252/514 |
| 4,731,297 | 3/1988 | Takaya | 428/553 |
| 4,746,557 | 5/1988 | Sakamoto et al. | 428/138 |
| 4,769,071 | 9/1988 | Klar et al. | 75/246 |

*Primary Examiner*—Stephen J. Lechert, Jr.
*Assistant Examiner*—Nina Bhat
*Attorney, Agent, or Firm*—Jane M. Binkowski; James C. Davis, Jr.; James Magee, Jr.

[57] ABSTRACT

A composite comprises of a sintered matrix of spinel ferrite and an electrically conductive phase of elemental silver is produced by co-firing a laminated structure of ferrite powder-containing tapes containing a silver metallization-forming material having two end portions wherein only the end portions are exposed.

10 Claims, No Drawings

FERRITE COMPOSITE CONTAINING SILVER METALLIZATION

This application is a division of application serial no. 172,834, filed Mar. 25, 1988, now Patent No. 4,880,599.

This invention relates to the production of a composite comprised of a sintered ceramic ferrite matrix containing an electrically conductive metallization of silver wherein such metallization has only its end portions exposed to the ambient.

The low melting point (961° C.) and high vapor pressures of silver at the temperatures required for the co-firing of silver metallized spinel ferrites limit the practical use of silver as a metallization to its alloys with other precious metals. In particular, due to requisite melting points, metal/ceramic adhesion requirements and cost, the most common alloys utilized are those with palladium wherein palladium contents generally exceed 30 weight %. A very large penalty results from the use of even 70/30 Ag-Pd since the resistivity of this alloy at 20° C. is of the order of 20 times that of silver.

The present invention enables the formation of a continuous metallization of silver in a co-fired ferrite body.

Briefly stated, the present process for producing a solid composite comprised of a ferrite matrix containing a continuous silver metallization with only its end portions exposed to the ambient, said ferrite matrix having a resistivity greater than 500 ohm-centimeters, comprises (a) providing a ferrite powder;

(b) admixing said ferrite powder with an organic binding material;

(c) forming the resulting mixture into tape;

(d) providing a silver metallization-forming material;

(e) forming a layered structure of at least two of said tapes containing said silver metallization-forming material therewithin in a pattern with two end portions, said metallization-forming material being present in an amount sufficient to produce said silver metallization;

(f) laminating the layered structure and forming a laminated structure wherein only said end portions of said pattern are exposed;

(g) firing said laminated structure to thermally decompose its organic component at an elevated temperature below about 600° C. leaving no significant deleterious residue, said firing being carried out in an atmosphere or vacuum which has no significant deleterious effect on said composite;

(h) sintering the resulting structure at a temperature ranging from about 1000° C. to about 1400° C. in an oxygen-containing atmosphere to produce a product having the composition of said composite; and (i) cooling said product to produce said composite, said sintering and cooling being carried out in an atmosphere which has no significant deleterious effect on said composite; said ferrite powder having a composition which forms said ferrite matrix in said process.

In carrying out the present process, a ferrite powder is provided which produces the present sintered ferrite matrix having an electrical resistivity greater than 500 ohm-centimeters, preferably greater than 0.1 megohm-centimeters, at a temperature ranging from about 20° C. to about 100° C. These powders are available commercially or can be prepared by standard ceramic processing, generally by calcining a particulate mixture of the constituent oxides which react by solid-state diffusion to form the desired ferrite which is then milled to produce the desired particle size distribution. By "resistivity" herein, it is meant the electrical resistance of the present sintered ferrite in the form of a bar one centimeter long and one square centimeter in cross-section.

The ferrite powder is a magnetic oxide. The term "magnetic" is used herein to indicate a material which is magnetized by a magnetic field. The ferrite powder is known in the art as a spinel ferrite and it is of cubic symmetry. The present ferrite powder has a composition represented by the formula $MO(Fe_2O_3)_{1 \pm x}$ where $x$ has a value ranging from 0 to about 0.2, preferably ranging from 0 to about 0.1, and where M is a divalent metal cation selected from the group consisting of Mg, Mn, Fe, Co, Ni, Zn, Cu, and a combination thereof. Representative of useful ferrites include nickel zinc ferrite and manganese zinc ferrite.

If desired, a minor amount of an inorganic oxide additive which promotes densification or has a particular effect on magnetic properties of spinel ferrites can be included in the starting powder. Such additives are well known in the art and include $CaO$, $SiO_2$, $B_2O_3$, $ZrO_2$ and $TiO_2$. As used herein, the term "ferrite powder" includes any additive which forms part of the matrix of the present composite. The particular amount of additive is determinable empirically and frequently, it ranges from about 0.01 mol % to about 0.05 mol % of the total amount of ferrite powder, i.e. the total amount of matrix-forming powder.

The matrix-forming powder is a sinterable powder. Its particle size can vary. Generally, it has a specific surface area ranging from about 0.2 to about 10 meters$^2$ per gram, and frequently, ranging from about 2 to about 4 meters$^2$ per gram, according to BET surface area measurement.

The organic binding material used in the present process bonds the particles together and enables formation of the required thin tape of desired solids content, i.e. content of matrix-forming powder. The organic binding material thermally decomposes at an elevated temperature ranging to below about 600° C., generally from about 100° C. to to about 300° C., to gaseous product of decomposition which vaporizes away leaving no residue, or no significant deleterious residue.

The organic binding material is a thermoplastic material with a composition which can vary widely and which is well known in the art or can be determined empirically. Besides an organic polymeric binder it can include an organic plasticizer therefor to impart flexibility. The amount of plasticizer can vary widely depending largely on the particular binder used and the flexibility desired, but typically, it ranges up to about 50% by weight of the total organic content. Preferably the organic binding material is soluble in a volatile solvent.

Representative of useful organic binders are polyvinyl acetates, polyamides, polyvinyl acrylates, polymethacrylates, polyvinyl alcohols, polyvinyl butyrals, and polystyrenes. The useful molecular weight of the binder is known in the art or can be determined empirically. Ordinarily, the organic binder has an average molecular weight at least sufficient to make it retain its shape at room temperature and generally such an average molecular weight ranges from about 20,000 to about 200,000, frequently from about 30,000 to about 100,000.

Representative of useful plasticizers are dioctyl phthalate, dibutyl phthalate, diisodecyl glutarate, polyethylene glycol and glycerol trioleate.

In carrying out the present process, the matrix-forming powder and organic binding material are admixed to form a uniform or at least a substantially uniform mixture or suspension which is formed into a tape of desired thickness and solids content. A number of conventional techniques can be used to form the mixture and resulting green tape. Generally, the components are milled in an organic liquid or solvent in which the organic material is soluble or at least partially soluble to produce a castable mixture or suspension. Examples of suitable solvents are methyl ethyl ketone, toluene and alcohol. The mixture or suspension is then cast into a tape of desired thickness in a conventional manner, usually by doctor blading which is a controlled spreading of the mixture or suspension on a carrier from which it can be easily released such as Teflon, Mylar or silicone coated Mylar or glass. The cast tape is dried to evaporate the solvent therefrom to produce the present tape which is then removed from the carrier.

The particular amount of organic binding material used in forming the mixture is determinable empirically and depends largely on the amount and distribution of solids desired in the resulting tape. Generally, the organic binding material ranges from about 25% by volume to about 50% by volume of the solids content of the tape.

The present tape or sheet can be as long and as wide as desired, and generally it is of uniform or substantially uniform thickness. Its thickness depends largely on its particular application. Generally, the tape has a thickness ranging from about 25 microns to about 1000 microns, frequently ranging from about 50 microns to about 900 microns, and more frequently ranging from about 100 microns to about 800 microns.

A layered structure of at least two of the tapes is formed which contains the silver metallization-forming material in a pattern with two end portions wherein none of the pattern is exposed or wherein only its end portions are exposed to the ambient. Such a layered structure can be formed by a number of techniques. Preferably, the tapes are substantially coextensive with each other, usually forming a sandwich-type structure. The silver metallization-forming material should be present in an amount at least sufficient to produce the desired continuous silver metallization, i.e. phase, in the resulting composite. Generally, the pattern is distributed, frequently significantly uniformly, in the layered structure.

The silver metallization-forming material can be any material containing or comprised of elemental silver which forms the desired continuous phase of elemental silver in the present composite. The silver metallization-forming material comprised of elemental silver can be in a number of physical forms such as particulates, or a solid body such as a strip, wire, sheet or punched sheet.

The silver metallization-forming material containing elemental silver usually is deposited from a suspension, for example, a paste or ink, of particles of elemental silver suspended in organic binder. The suspension is deposited, usually by screen printing, on the tape and, when dry, produces the desired predetermined pattern of silver metallization-forming material. Such suspensions are known and are available commercially, and preferably, they are free of glass frit. Generally, the silver particles range in size from about 0.1 micron to about 20 microns. Any organic component of the metallization-forming material thermally decomposes at a temperature below about 600° C. leaving no significant deleterious residue.

In one embodiment for forming the layered structure, the silver metallization-forming material is deposited on the face of a first tape, preferably to form a pattern through the length thereof, and then covered with a second tape leaving none of the pattern exposed to the ambient.

In another embodiment, the silver metallization-forming material is deposited on the face of a first tape to form a pattern thereon, frequently with its end portions protruding therefrom, and then covered with a second tape leaving only its end portions exposed to the ambient.

In yet another embodiment, the first and second tapes each have a feedthrough hole punched therein, metallization-forming material is deposited in the holes as well as on the face of the first tape to form a pattern in the resulting layered structure wherein only the end portions of the pattern in the holes are exposed to the ambient.

In yet another embodiment, the metallization-forming material is deposited or printed in a preselected form on the face of a number of tapes. Feedthrough holes may be punched in the tapes as required for layer interconnection and filled with metallization-forming material to provide a conductive path. The tapes can then be stacked together, generally one on top of the other, to produce the present layered structure wherein the totally deposited metallization-forming material comprises a pattern with two end portions and wherein none of the pattern is exposed, or wherein only its end portions are exposed, to the ambient.

In still another embodiment, the present layered structure contains a plurality of separate individual, i.e. discrete, patterns of silver metallization-forming material wherein each pattern has two end portions and wherein the end portions of the patterns may, or may not be, exposed to the ambient.

The layered structure is then laminated under a pressure and temperature determinable empirically depending largely on the particular composition of the organic binding material to form a laminated structure. Lamination can be carried out in a conventional manner. Laminating temperature should be below the temperature at which there is decomposition, or significant decomposition, of organic binding material and generally, an elevated temperature below 150° C. is useful and there is no significant advantage in using higher temperatures. Typically, the lamination temperature ranges from about 35° C. to about 95° C. and the pressure ranges from about 500 psi to about 3000 psi. Generally, lamination time ranges from about ½ to about 5 minutes. Also, generally, lamination is carried out in air.

In the directly produced laminated structure, if the end portions of the pattern are not exposed, the structure should be cut or sliced to produce a laminated structure wherein only the end portions of each pattern are exposed to the ambient.

Generally, the laminated structure is plastic, pliable or moldable and it can be arranged or shaped by a number of conventional techniques into a desired simple, hollow and/or complex form which is retained after sintering. For example, the laminated structure can be wound around into a coil in a single plane, or into a spiral form in a plurality of planes.

The laminated structure is fired to produce the present composite. At a temperature of less than about 600°

C., thermal decomposition of organic material is completed. Thermal decomposition can be carried out in any atmosphere, generally at or below atmospheric pressure, which has no significant deleterious effect on the sample such as, for example, air. If desired, thermal decomposition may be carried out in a partial vacuum to aid in removal of gases.

The resulting structure is sintered at a temperature ranging from about 1000° C. to about 1400° C., frequently from about 1100° C. to about 1300° C., depending largely on its composition and the particular composite desired. A temperature below about 1000° C. is not operable to produce the present composite. A temperature higher than about 1400° C. provides no advantage and may not produce the present composite.

During sintering the matrix-forming powder densifies, i.e. it shrinks in volume, and the elemental silver is molten. Since the silver is located within the structure, it cannot evaporate and evaporation of silver from the exposed end portions is not enough to remove the silver from inside the structure. Since elemental silver cannot shrink, it partly squeezes out to its end portions but there is sufficient surface tension to hold a sufficient amount of silver within the structure to produce the electrically conductive phase of silver in the present composite.

Sintering is carried out in an oxygen-containing atmosphere the composition of which depends largely on the composition of the matrix-forming powder as well as on the matrix composition desired. Also, upon completion of sintering, the sintered product may be cooled in the same atmosphere used for sintering, or in some other atmosphere such as, for example, an atmosphere which may be needed to maintain certain matrix compositions. The sintering and cooling atmospheres should have no significant deleterious effect on the present composite. Generally, the sintering and cooling atmospheres are at about atmospheric or ambient pressure, and generally the sintered product is cooled to about room temperature, i.e. from about 20° C. to 30° C. The sintering and cooling atmospheres for the production of spinel ferrite bodies are well known in the art.

As an example, when all of the cations of the matrix-forming powder are in their highest valence, and such valence state is to be retained in the sintered matrix, sintering is carried out in an oxidizing oxygen-containing atmosphere. In such instance, oxygen generally is present in an amount greater than about 50% by volume of the atmosphere and the remaining atmosphere frequently is a gas selected from the group consisting of nitrogen, a noble gas such as argon, and a combination thereof. Usually, the sintering atmosphere is comprised of air or oxygen. Also, in such instance, the sintered product generally is cooled in an oxidizing oxygen-containing atmosphere, usually the same atmosphere used for sintering, or some other atmosphere in which the sintered product is inert or substantially inert to produce the desired composite.

However, as another example, if the matrix-forming ferrite powder contains $Fe^{2+}$ cation, or if the $Fe^{3+}$ is to be reduced to produce a certain small amount of $Fe^{2+}$ cation to produce certain magnetic properties, sintering is carried out in a reducing oxygen-containing atmosphere wherein the oxygen content is controlled to produce and/or maintain the $Fe^{2+}$ cation in the desired amount. Also, in this instance, upon completion of sintering, at least during part of the cooling cycle, the oxygen content of the atmosphere is controlled, usually decreased, to maintain the desired amount of $Fe^{2+}$ cation. Generally, the reducing oxygen-containing atmosphere is comprised of oxygen and nitrogen or an inert gas such as argon wherein the effective amount of oxygen generally ranges up to about 10% by volume of the atmosphere.

In a preferred embodiment, to insure against significant vaporization loss of elemental silver, the laminated structure is fired, sintered and cooled in a container which is open to the atmosphere sufficiently only to allow removal of gaseous products of thermal decomposition as well as to enable exposure of the sample to the desired sintering and cooling atmospheres. Preferably, the container contains some elemental silver in close proximity to the sample to further inhibit vaporization of its silver component. The container should be comprised of a material which is stable in the present process, i.e. a material which does not react with the sample such as alumina. Generally, the container is comprised of a boat with a cover.

Generally, sintering can be controlled in a conventional manner, i.e. by shortening sintering time and/or lowering sintering temperature, to produce a sintered matrix having a desired density or porosity or having a desired grain size. Sintering time may vary widely and generally ranges from about 5 minutes to about 5 hours. Usually, the longer the sintering time or the higher the sintering temperature, the more dense is the matrix and the larger is the grain size.

The present sintered matrix has a porosity ranging from about 0%, or about theoretical density, to about 40% by volume of the sintered matrix. The particular porosity depends largely on the particular magnetic properties desired. For several applications, the porosity of the sintered matrix ranges from about 5% to about 30%, or from about 10% to about 25%, and frequently it is about 15%, by volume of the total volume of the matrix. Generally, the lower the porosity of the matrix, the higher is its magnetic permeability. In the present composite, porosity is distributed therein, preferably significantly or substantially uniformly. Generally, the pores range in size from about 1 micron to about 100 microns, frequently from about 10 microns to about 70 microns. The pores may be closed and/or interconnecting.

Generally, the average grain size of the present sintered matrix ranges from about 5 microns to about 100 microns, frequently from about 10 microns to about 80 microns, or from about 20 microns to about 60 microns, or from about 30 microns to about 50 microns. Generally, with increasing grain size, the magnetic permeability of the composite increases. On the other hand, generally with decreasing grain size, the lower are the electrical losses.

The present composite is comprised of a polycrystalline matrix of ferrite containing a continuous electrically conductive phase, i.e. metallization, of elemental silver having two end portions wherein only both end portions are exposed to the ambient and are at least sufficient for electrical contact to be made such as, for example, by soldering a lead thereon. In one embodiment, the present composite contains a plurality of such electrically conductive phases of elemental silver wherein the phases are electrically isolated from each other and wherein each phase has two end portions with only the end portions exposed to the ambient. The presence of the silver phase in the composite can be determined by x-ray. The continuity of the silver metallization can be determined by a number of conventional techniques such as, for example, by contacting the exposed silver end portions with leads to determine electrical conductivity.

The present invention enables the direct production of a composite of desired shape and size.

The present ferrite matrix is a soft magnetic material of cubic symmetry. Its composition is the same as that given herein for the matrix-forming material. It can be magnetized but loses its magnetization when the source of magnetization is removed. For example, when a voltage is applied across both exposed end portions of the silver phase in the present composite, current is passed therethrough producing a magnetic field which magnetizes the ferrite matrix thereby storing electrical energy therein. When the voltage is removed, the ferrite matrix will demagnetize giving back the electrical energy as a reverse electrical current in the silver phase.

The present composite has a number of uses. It is useful as an electrical component in an electrical circuit. It is particularly useful as an electrical inductor such as, for example, a tuning coil or a filter coil.

When the present composite contains two or more separate silver conductors or windings, each of which is accessed by two exposed end portions, such a composite is useful as an electrical transformer.

The invention is further illustrated by the following examples wherein the procedure was as follows unless otherwise stated:

An air furnace with molybdenum disilicide heaters was used.

The firing, sintering and cooling was carried out in air at about atmospheric pressure.

The ferrite powder was a sinterable powder.

The organic binding material was comprised of commercially available organic binder comprised of polyvinylbutyral (average molecular weight of about 32,000) and commercially available liquid plasticizer comprised of polyunsaturated hydroxylated low-molecular weight organic polymers. Specifically, the organic binding material was comprised of 4.13 grams of polyvinylbutyral and 1.48 grams of liquid plasticizer per 100 grams of ferrite powder.

In the laminated structure, the silver strip overhung the sides of the structure by about 1/8 inch.

Standard techniques were used to characterize the composite for density, microstructure and electrical properties.

EXAMPLE 1

Ferrite powder having a composition comprised of $Ni_{.4}Zn_{.6}Mn_{.02}Fe_{1.9}O_4$ and having a specific surface area of about 1 m$^2$/g was used.

Ferrite tapes of different thicknesses were prepared by the tape casting technique. 5.61 grams of the organic binding material were dissolved at ambient temperature in 50 grams of a mixture of 33 grams of toluene and 17 grams of methyl alcohol. The resulting solution was admixed with 100 grams of ferrite powder in a ball mill for about 4 hours at room temperature. The resulting slurry was tape cast on a Mylar sheet using a doctor blade, then dried in air at room temperature and atmospheric pressure to remove the solvent, and the resulting tape was stripped from the Mylar sheet.

Each tape was about 6 inches wide, 30 inches long and had a substantially uniform thickness. Ferrite powder was distributed in each tape substantially uniformly and comprised about 52% by volume of the tape.

Each tape was cut to lengths of about 1.5 inches and width of about 1 inch.

A strip of elemental silver 5 mils thick and about 100 mils wide was deposited on the face of a first tape of about 20 mils thickness across the length thereof with about 100 mil overhangs. Side pieces of a second layer of tape, about 5 mils thick, were placed on the first tape abutting the lengthwise edges of the silver strip. A third tape of about 20 mils thick was placed on top of the assembly covering the silver strip forming a three layer structure where only the end portions of the silver strip were exposed to the ambient.

The layered structure, i.e. this first layered structure, was laminated in air in a laminating press at about 93° C. under a pressure of about 1000 psi for about ½ minute to produce a first laminated structure which on subsequent sintering produced a first composite.

A second laminated structure was produced in substantially the same manner as the first except that the ferrite powder was comprised of $Ni_{.25}Zn_{.45}Mn_{.1}Fe_{2.1}O_4$. This second laminated structure produced on subsequent sintering a second composite.

The laminated structures were placed in a dense alumina tray in which excess silver strips were in near proximity to them. The tray was covered with an alumina lid and placed in the furnace.

As the temperature was raised, the organic component of the laminated structures thermally decomposed and vaporized away below 600° C. The samples were sintered at a temperature of about 1330° C. for 1 hour and then cooled to room temperature.

The resulting composites were comprised of a polycrystalline ferrite matrix and a metallization of elemental silver with only its end portions exposed to the ambient. X-rays of each composite showed the presence of the silver metallization.

Evaporation loss of silver was slight as shown by an increase rather than decrease in volume of the edge droplets of silver as compared to the initial volume of the overhanging silver portions.

The contact angle of silver with the ferrite matrix in the first composite was determined to be 65 degrees, and in the second composite it was 57 degrees, across the solidified silver liquid which indicates that the ferrite was wetted by the molten silver.

From other work it was known that the ferrite matrix of both composites had a composition which was the same as, or did not differ significantly from, that of the starting ferrite powder, and that it was of cubic symmetry.

The ferrite matrix of both composites had a porosity of about 5% by volume which was distributed through the matrix. Also, the ferrite matrix of the first composite had an average grain size of about 10 microns and that of the second composite was about 20 microns.

The metallization in each composite was determined to be electrically conductive and therefore continuous. Specifically, leads were contacted with the end portions of each silver metallization and current was passed therethrough which magnetized the ferrite matrix. When the current was stopped, the ferrite matrix demagnetized. These composites would be useful as electrical inductors.

EXAMPLE 2

This Example was carried out in substantially the same manner as Example 1 except as noted herein. The layered structure produced in this example was substantially the same as the first layered structure of Example 1 except that it also contained two separate silver wires of 10 mil diameter displaced on either side of the silver strip with end portions overhanging the structure. Also, the alumina tray was not covered with a lid and the sintering temperature was about 1440° C.

The resulting composite was comprised of a polycrystalline ferrite matrix and a metallization of elemental silver with only its end portions exposed to the ambient. X-rays of the composite showed the presence of the silver metallization.

Evaporation loss of silver was heavy as shown by disappearance of all edge overhangs of the 10 mil wire in the composite.

The contact angle of silver with the ferrite matrix was determined to be 60 degrees across the solidified silver liquid which indicated that ferrite was wetted by the molten silver.

From other work it was known that the ferrite matrix had a composition which was the same as, or did not differ significantly from, that of the starting ferrite powder, and that it was of cubic symmetry.

The ferrite matrix had a porosity of about 5% by volume which was distributed through the matrix. Also, the ferrite matrix had an average grain size of about 10–15 microns.

The metallization was determined to be electrically conductive and therefore continuous. Specifically, leads were contacted with the end portions of the silver metallization and current was passed therethrough which magnetized the ferrite matrix. When the current was stopped, the ferrite matrix demagnetized. This composite would be useful as an electrical inductor.

EXAMPLE 3

This example was carried out in substantially the same manner as Example 1 except as noted herein.

The spinel ferrite powder was comprised of 48.22 mol% $Fe_2O_3$, 25.38 mol% NiO, 25.38 mol% ZnO and 1.02 mol% MnO yielding an $Fe_2O_3$/MO mol ratio of about 0.93. The average particle size of the ferrite powder was about 1 micron and the tapes were prepared in a 15 mil thickness.

Eight 1.5 inch by 1.5 inch blanks were cut from the tape. Silver patterns about 1 mil thick consisting of seven U-shaped traces about 20 mils wide were screen printed on a face of two of the blanks.

The eight blanks were formed into a layered structure, i.e. a sandwich structure, with the two blanks containing the patterns being in the central portion thereof and separated from each other by a blank. The layered structure had 14 separate U-shaped patterns, none of which were exposed.

The layered structure was laminated. The resulting laminate was cut across the legs of the U-shaped patterns into a rectangular form, 1.5 inch by about .625 inch, to produce a structure wherein both end portions of each pattern were exposed.

The laminated structure was then fired in a covered tray with excess silver in near proximity in a schedule to remove the organic material therefrom below 600° C. and to sinter at 1250° C. for 30 minutes.

Examination of the resulting composite showed that the sintered shrinkage was about 19%. The composite was comprised of a polycrystalline ferrite matrix and 14 U-shaped metallizations of elemental silver wherein only the end portions of each metallization were exposed. The metallizations were continuous, electrically conducting with about 0.1 ohm resistance and electrically isolated from one another by about 0.5 megohm resistance.

The ferrite matrix had a porosity of about 10% which was distributed through the matrix. Also, the ferrite matrix had an average grain size of about 10 microns.

From other work it was known that the ferrite matrix had a composition which was the same as, or did not differ significantly from, that of the starting ferrite powder, and that it was of cubic symmetry.

This composite would be useful as an electrical transformer.

What is claimed is:

1. A composite comprised of a polycrystalline ferrite matrix containing a continuous electrically conductive metallization of elemental silver, said silver metallization having two end portions and having only said end portions exposed at least sufficiently for electrical contact to be made therewith, said ferrite matrix having an electrical resistivity greater than 500 ohm-centimeters at a temperature ranging from about 20° C. to about 100° C., said ferrite matrix ranging up to about 40% by volume in porosity.

2. The composite according to claim 1 wherein said silver metallization is distributed in said composite in substantially a single plane.

3. The composite according to claim 1 wherein said silver metallization is distributed in said matrix in a plurality of planes.

4. The composite according to claim 1 in the form of a coil in substantially a single plane.

5. The composite according to claim 1 in the form of a spiral in a series of planes.

6. The composite according to claim 1 which contains a plurality of said electrically conductive metallizations of elemental silver which are electrically isolated from each other.

7. The composite according to claim 1 wherein said ferrite matrix has a composition comprised of $MO(Fe_2O_3)_{1\pm x}$ where x has a value ranging from 0 to about 0.2 and where M is a divalent metal cation selected from the group consisting of Mg, Mn, Fe, Co, Ni, Zn, Cu and combinations thereof.

8. The composite according to claim 1 wherein said ferrite matrix is a nickel zinc manganese ferrite.

9. The composite comprised of a polycrystalline ferrite matrix of cubic symmetry containing a continuous electrically conductive metallization of elemental silver, said metallization having two end portions and having only said end portions exposed at least sufficiently for electrical contact to be made therewith, said ferrite matrix having an electrical resistivity greater than 500 ohm-centimeters at a temperature ranging from about 202 C. to about 100° C., said ferrite matrix having a porosity ranging from about 10% to about 25% by volume of said matrix, said matrix having an average grain size ranging from about 10 microns to about 80 microns, said matrix being comprised of $MO(Fe_2O_3)_{1\pm x}$ where x has a value ranging from 0 to about 0.1 and where M is a divalent metal cation selected from the group consisting of Mg, Mn, Fe, Co, Ni, Zn, Cu and combinations thereof.

10. The composite according to claim 9 wherein said ferrite matrix contains a member selected from the group consisting of CaO, $SiO_2$, $B_2O_3$, $B_2O_3$, $ZrO_2$, $TiO_2$ and combinations thereof in an amount ranging from about 0.01 mol % to about 0.05 mol % of the total amount of said ferrite matrix.

* * * * *